(12) United States Patent
Eizaguirre Aguirrezabalaga

(10) Patent No.: US 12,324,410 B2
(45) Date of Patent: Jun. 10, 2025

(54) PET SECURITY DEVICE FOR VEHICLES

(71) Applicant: PLASTICOS ZARAUZ, S.A., Zarauz (ES)

(72) Inventor: Gabriel Eizaguirre Aguirrezabalaga, Zarauz (ES)

(73) Assignee: PLASTICOS ZARAUZ, S.A., Zarauz (ES)

( * ) Notice: Subject to any disclaimer, the term of this patent is extended or adjusted under 35 U.S.C. 154(b) by 0 days.

(21) Appl. No.: 18/198,087

(22) Filed: May 16, 2023

(65) Prior Publication Data
US 2023/0371469 A1 Nov. 23, 2023

(30) Foreign Application Priority Data
May 17, 2022 (EP) .................................. 22382473

(51) Int. Cl.
*A01K 1/02* (2006.01)
*A01K 13/00* (2006.01)
*B60R 22/10* (2006.01)
*B60R 22/26* (2006.01)

(52) U.S. Cl.
CPC .......... *A01K 1/0272* (2013.01); *A01K 1/0263* (2013.01); *A01K 13/006* (2013.01); *B60R 22/10* (2013.01); *B60R 22/26* (2013.01)

(58) Field of Classification Search
CPC ..... A01K 1/0272; A01K 1/0263; B60R 22/10
See application file for complete search history.

(56) References Cited

U.S. PATENT DOCUMENTS

| | | | | |
|---|---|---|---|---|
| 4,715,618 A * | 12/1987 | Harris | ..................... | B60R 22/10 280/801.1 |
| 5,167,203 A * | 12/1992 | Scott | ..................... | A01K 27/002 297/485 |
| 5,529,018 A * | 6/1996 | Butts | ..................... | A01K 1/0263 119/792 |
| 5,915,335 A * | 6/1999 | Holt, Jr. | ............... | A01K 1/0263 119/770 |
| 9,580,041 B1 * | 2/2017 | Leung | ................... | A01K 1/0272 |
| 2011/0083615 A1 * | 4/2011 | Aaron | ..................... | B60R 22/10 119/771 |
| 2016/0316714 A1 * | 11/2016 | Frick | ..................... | A01K 1/0272 |
| 2018/0334078 A1 | 11/2018 | Wang | | |

FOREIGN PATENT DOCUMENTS

| | | | |
|---|---|---|---|
| DE | 203 06 653 U1 | 7/2003 | |
| EP | 1 940 220 B1 | 12/2009 | |
| FR | 2594079 A * | 8/1987 | ........... A01K 27/002 |

OTHER PUBLICATIONS

Dittmann translation taken from family document DE202005017519, retrieved from EPO Jul. 22, 2024 (Year: 2020).*
European Search Report for EP App. No. 22 38 2473 dated Nov. 3, 2022 (2 pages).

* cited by examiner

*Primary Examiner* — Kristen C Hayes
(74) *Attorney, Agent, or Firm* — David W. Carstens; Carstens, Allen & Gourley, LLP

(57) ABSTRACT

The pet security device for vehicles comprises a harness provided with straps that includes two first straps (1), each of them including at one end a fastening element (2); a second strap (3) that crosses the first straps (1); and a third strap (4), whose ends are attached to the ends of the second strap (3).

It provides an increased security in comparison to other security devices for pets that are not specifically designed for their use in vehicles.

9 Claims, 3 Drawing Sheets

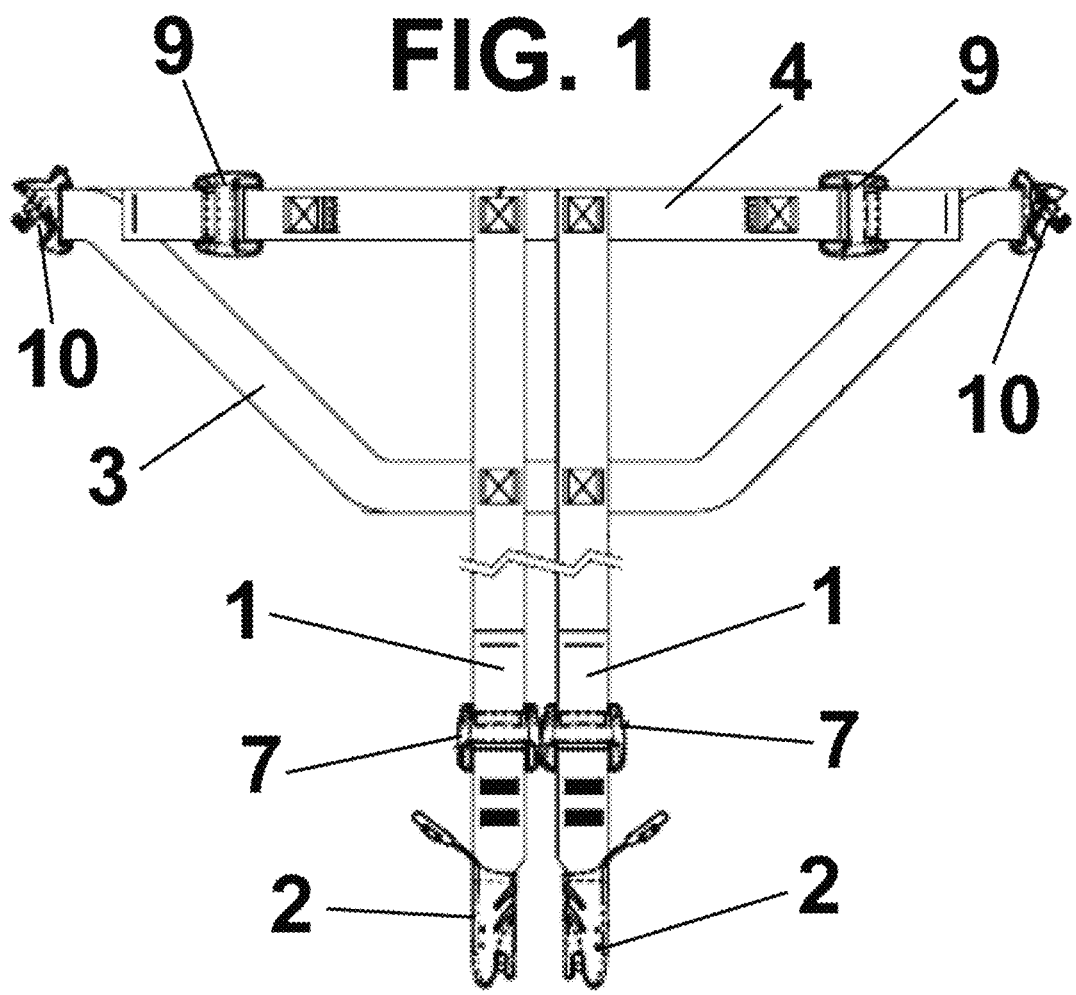
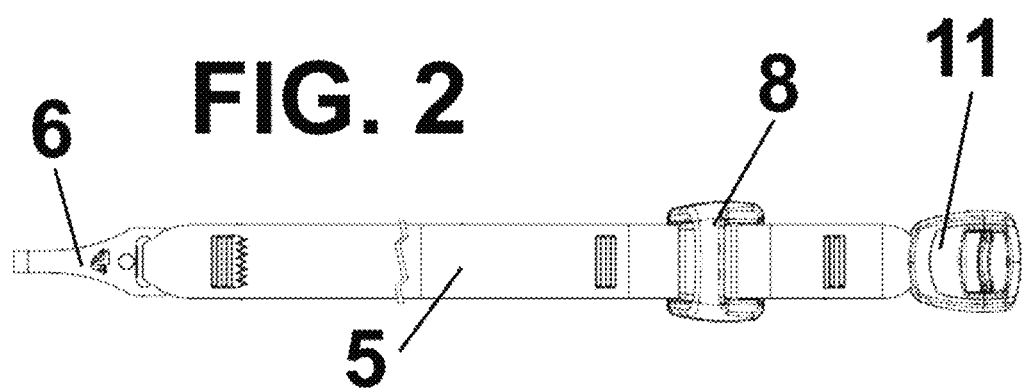

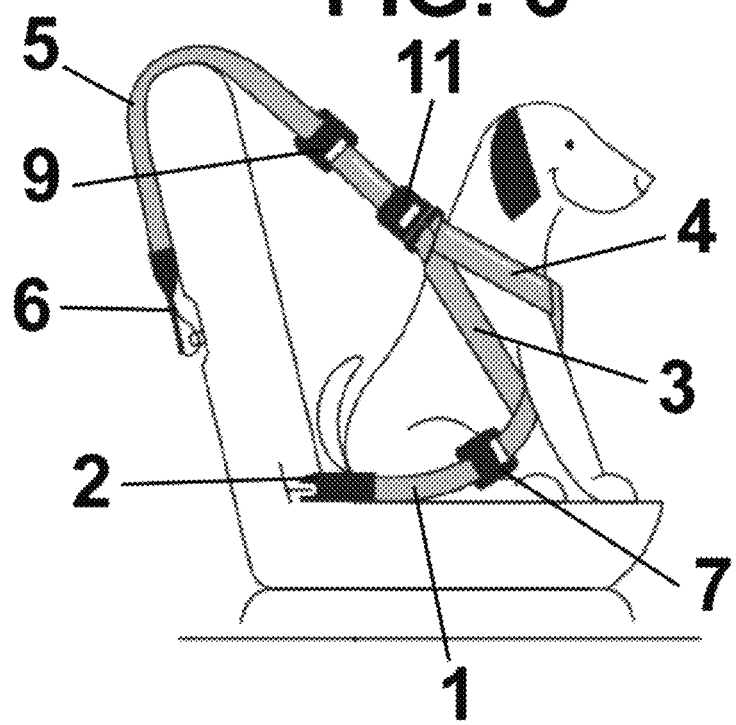
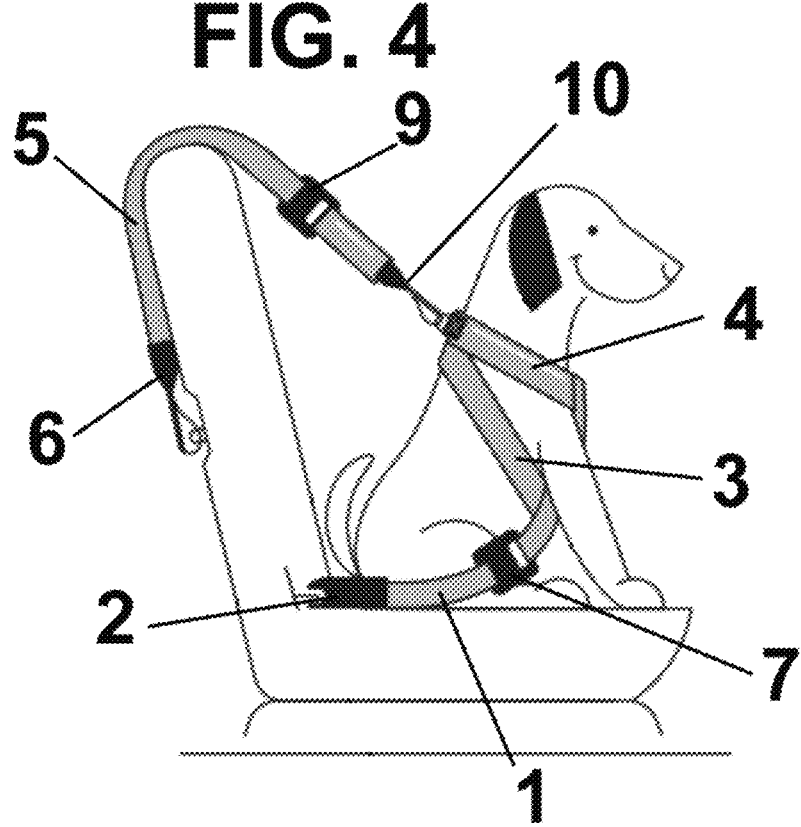

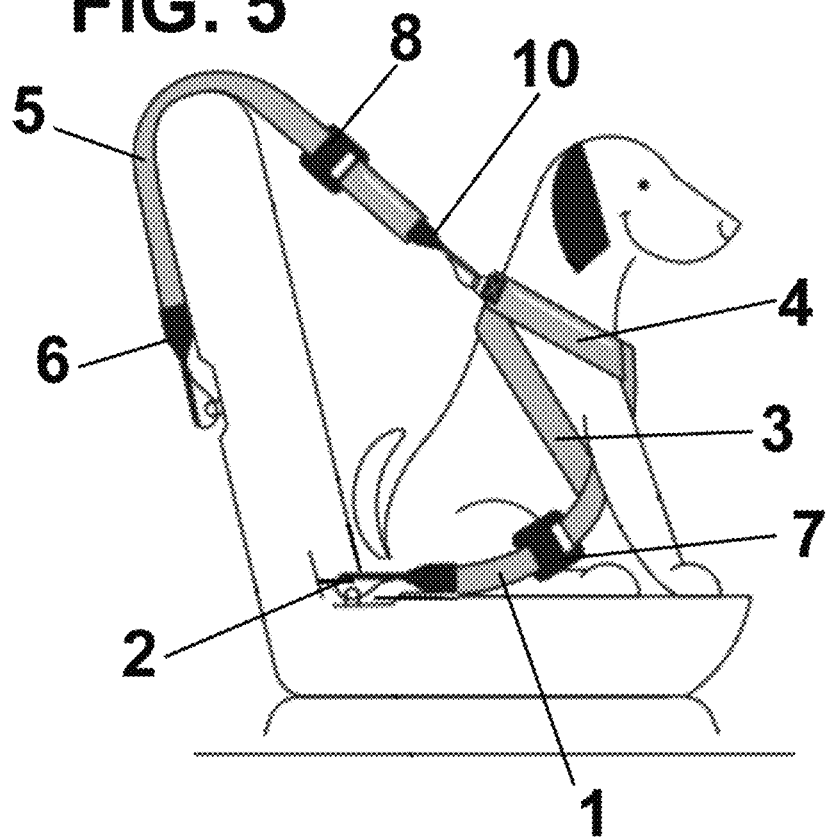

PET SECURITY DEVICE FOR VEHICLES

CROSS REFERENCE TO RELATED APPLICATION

This application claims priority to European Patent Application No. 22382473.1 filed on May 17, 2022, which is incorporated herein by reference in its entirety.

FIELD OF THE INVENTION

The present invention relates to a pet security device for vehicles, that is used to retain a pet, e.g., a dog, in a vehicle.

BACKGROUND OF THE INVENTION

For increasing the security of the occupants of vehicles it is common the use of security systems such as seat belts and retaining seats.

Furthermore, modern vehicles include a certified retaining system that is known as Isofix, that permits the attachment of compatible retaining child seats.

These security systems are designed to be used for adults, children, and babies, but they are usually not designed for pets, such as dogs or cats.

When an increased security is desired for a pet travelling inside a vehicle, harnesses that are attached to the seat belts of the vehicle are normally used. These harnesses have usually the same design that harnesses used for walking a dog.

This means that the security provided by these harnesses is not optimized for their use inside a vehicle.

DISCLOSURE OF THE INVENTION

Therefore, an objective of the present invention is to provide a pet security device for vehicles, providing an optimized design that provides an increased security in comparison to other security devices for pets that are not specifically designed for their use in vehicles.

With the pet security device of the invention said disadvantages are solved, presenting other advantages that will be described below.

The pet security device according to the present invention is defined in claim 1, and further optional features are included in the dependent claims.

In particular, the pet security device for vehicles comprises a harness including:
  two first straps, each of them including at one end a fastening element;
  a second strap that crosses the first straps; and
  a third strap, whose ends are attached to the ends of the second strap.

Advantageously, the pet security device for vehicles according to the present invention also comprises a fourth strap that is detachably attached to the second strap on one end and that includes at other end a fastening element.

According to a preferred embodiment, the first straps are placed one besides the other and substantially parallel to each other.

Furthermore, the second strap has advantageously a U-shape, the central portion of the U-shape being attached to the first straps.

Preferably, each of the first straps comprises an adjuster, the fourth strap also comprises an adjuster, and the third strap comprises a pair of adjusters.

Advantageously, the fastening element of the first straps is a hook or an Isofix connector, the fastening element of the fourth strap is a hook, and the fourth strap is detachably attached to the second strap by a buckle or a hook and rings arrangement.

The pet security device for vehicles according to the present invention is optimized for providing an increased security in comparison to other security devices for pets that are not specifically designed for their use in vehicles.

In particular, the fastening elements of the first straps permits their connection to an Isofix security system of the vehicle, and the fastening element of the fourth strap permits its connection to an anti-rotation point of the vehicle.

Furthermore, the adjusters permit to easily adjust the straps to the pet that uses the security device to guarantee a suitable and comfortable fastening of the pet to the vehicle.

BRIEF DESCRIPTION OF THE DRAWINGS

For better understanding of what has been disclosed, some drawings in which, schematically and only by way of a non-limiting example, a practical case of embodiment is shown.

FIG. 1 is a plan view of the pet security device according to the present invention;

FIG. 2 is a plan view of a fourth strap of the pet security device according to the present invention; and FIGS. 3-5 are side elevation views of three alternative embodiments of the pet security device according to the present invention.

DESCRIPTION OF PREFERRED EMBODIMENTS

The pet security device for vehicles is specially designed for retaining a pet inside a vehicle, so that it provides an increased security for the pet in the case of an accident.

The pet security device comprises a harness, which is shown in FIG. 1. This harness comprises two first straps (1), that are placed in a central portion of the harness and one besides the other and substantially parallel to each other.

Each first strap (1) comprises at one end a fastening element (2) and in an intermediate position an adjuster (7).

The fastening element (2) can be an Isofix connector, a hook, or any suitable fastening element, so that the fastening element (2) is fastened to the Isofix system of the vehicle.

The harness also comprises a second strap (3) that crosses the first straps (1) and has a U-shape, as shown in FIG. 1. This second strap (3) is attached to the first straps (1), e.g. by stitching, at its central portion.

At the ends of the second strap (3) there are placed connecting elements, such as, e.g. portions of a buckle (10), that are detachable engaged with complementary buckle portions, that will be described hereinafter.

The harness also comprises a third strap (4) that is attached by their ends to the second strap (3), and this third strap (4) is also attached to the ends of the first straps (1) opposite to the fastening elements (2), e.g. by stitching.

This third strap (4) also comprises to adjusters (9) placed near its ends.

The pet security device for vehicles according to the present invention also comprises a fourth strap (5) shown in FIG. 2. This fourth strap (5) comprising at one of its ends a fastening element (6) that in its use position is engaged with an anti-rotation point provided in the vehicle.

At the other end of the fourth strap (5) it is placed a buckle (11), that is complementary to the buckle portions (10) of the second strap (3). This fourth strap (5) also comprises an adjuster (8).

In FIGS. 3-5 three alternative embodiments are shown.

The differences between these embodiments are the fastening elements (2) of the first straps (1) and the detachable connection between the fourth strap (5) and the second strap (3).

In FIGS. 3 and 4, the fastening elements (2) are Isofix connectors, and in FIG. 5 the fastening elements (2) are hooks.

Furthermore, in FIG. 3, the detachable connection between the fourth strap (5) and the second strap (3) is made by a buckle (10) and in FIGS. 5 and 6, it is made by a hook and ring arrangement.

When the security device is used, firstly the harness is placed on the pet, passing the legs of the pet through the holes defined by the first, second and third straps, as shown in FIGS. 3-5.

Then, the first straps (1) are attached to the Isofix system of the vehicle by the fastening elements (2), and finally the fourth strap (5) is connected to the second strap (3) and this fourth strap (5) is attached to the anti-rotation point of the vehicle.

Although reference has been made to specific embodiments of the invention, it is apparent to a person skilled in the art that the described pet security device is susceptible of numerous variations and modifications, and that all the details mentioned can be replaced by other technically equivalents, without departing from the scope of protection defined by the appended claims.

The invention claimed is:

1. Pet security device for vehicles, comprising a harness provided with straps, characterized in that the harness comprises:
   two first straps (1), each of them including at one end a fastening element (2);
   a u-shaped second strap (3) that attaches at its central portion to the first straps (1); and
   a third strap (4), whose ends are attached to the ends of the second strap (3) and whose central portion is attached to the ends of the first straps (1) opposite the fastening elements (2).

2. Pet security device for vehicles according to claim 1, wherein it also comprises a fourth strap (5) that is detachably attached to the second strap (3) on one end and that includes at other end a fastening element (6).

3. Pet security device for vehicles according to claim 2, wherein the fourth strap (5) comprises an adjuster (8).

4. Pet security device for vehicles according to claim 2, wherein the fastening element (6) of the fourth strap (5) is a hook.

5. Pet security device for vehicles according to claim 2, wherein the fourth strap (5) is detachably attached to the second strap (3) by a buckle (10, 11) or a hook and rings arrangement.

6. Pet security device for vehicles according to claim 1, wherein the first straps (1) are placed one besides the other and substantially parallel to each other.

7. Pet security device for vehicles according to claim 1, wherein each of the first straps (1) comprises an adjuster (7).

8. Pet security device for vehicles according to claim 1, wherein the third strap (4) comprises a pair of adjusters (9).

9. Pet security device for vehicles according to claim 1, wherein the fastening element (2) of the first straps (3) is a hook.

* * * * *